United States Patent
Stolper

(10) Patent No.: US 10,754,321 B2
(45) Date of Patent: Aug. 25, 2020

(54) AUTOMATIC QUALITY EVALUATION FOR A SEQUENCE OF MOVEMENT COMMANDS

(71) Applicant: Siemens Aktiengesellschaft, München (DE)

(72) Inventor: Thilo Stolper, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/332,688

(22) PCT Filed: Aug. 25, 2017

(86) PCT No.: PCT/EP2017/071402
§ 371 (c)(1),
(2) Date: Mar. 12, 2019

(87) PCT Pub. No.: WO2018/050423
PCT Pub. Date: Mar. 22, 2018

(65) Prior Publication Data
US 2019/0361423 A1    Nov. 28, 2019

(30) Foreign Application Priority Data

Sep. 13, 2016    (EP) .................................... 16188567

(51) Int. Cl.
*G05B 19/4068* (2006.01)
*G05B 19/4063* (2006.01)

(52) U.S. Cl.
CPC ..... *G05B 19/4068* (2013.01); *G05B 19/4063* (2013.01); *G05B 2219/35304* (2013.01); *G05B 2219/35349* (2013.01)

(58) Field of Classification Search
CPC ............ G05B 19/4063; G05B 19/4068; G05B 2219/35304; G05B 2219/35342; G05B 2219/35349; G05B 2219/49084
See application file for complete search history.

(56) References Cited

U.S. PATENT DOCUMENTS

| | | | |
|---|---|---|---|
| 2003/0171840 A1 | 9/2003 | Haupt | |
| 2003/0216830 A1* | 11/2003 | Hasebe | G05B 19/4068 700/184 |

(Continued)

FOREIGN PATENT DOCUMENTS

| | | |
|---|---|---|
| DE | 102010036499 A1 | 2/2011 |
| EP | 1315058 A1 | 5/2003 |

OTHER PUBLICATIONS

PCT International Search Report and Written Opinion of International Searching Authority dated Nov. 15, 2017 corresponding to PCT International Application No. PCT/EP2017/071402 filed Aug. 25, 2017.

(Continued)

*Primary Examiner* — Yuhui R Pan
(74) *Attorney, Agent, or Firm* — Henry M. Feiereisen LLC

(57) ABSTRACT

Movement commands in a sequence of movement commands each define a position to be adopted by a tool of a processing machine relative to a workpiece. During the execution of the sequence of movement commands by a control device of the processing machine, the tool machines the workpiece at least intermittently. The movement commands, during their execution by the control device of the processing machine, are converted into a trajectory including the defined positions. A depiction of the trajectory defined by the sequence of movement commands is output to a user. The distances between the positions of directly successive movement commands are ascertained. Positions (Continued)

of directly successive movement commands whose distance is below a predetermined minimum distance are highlighted in the depiction by means of a marker.

14 Claims, 10 Drawing Sheets

(56) References Cited

U.S. PATENT DOCUMENTS

| | | | |
|---|---|---|---|
| 2007/0046677 A1* | 3/2007 | Hong | G05B 19/41 345/442 |
| 2011/0046773 A1 | 2/2011 | Iwashita et al. | |
| 2014/0100688 A1 | 4/2014 | Tezuka et al. | |

OTHER PUBLICATIONS

PCT International Preliminary Examination Report and Written Opinion of International Examination Authority dated Aug. 17, 2018 corresponding to PCT International Application No. PCT/EP2017/071402 filed Aug. 25, 2017.

* cited by examiner

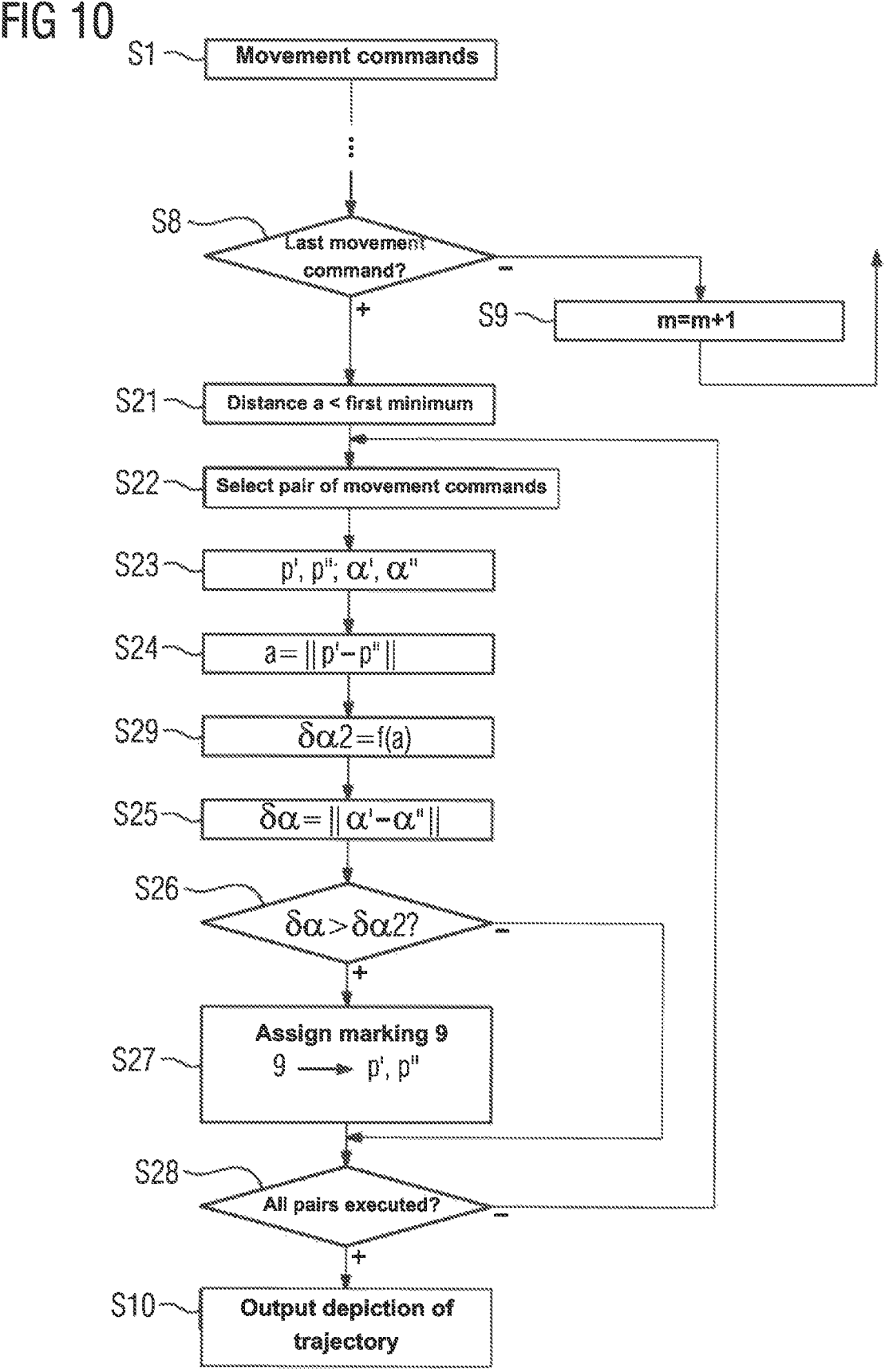

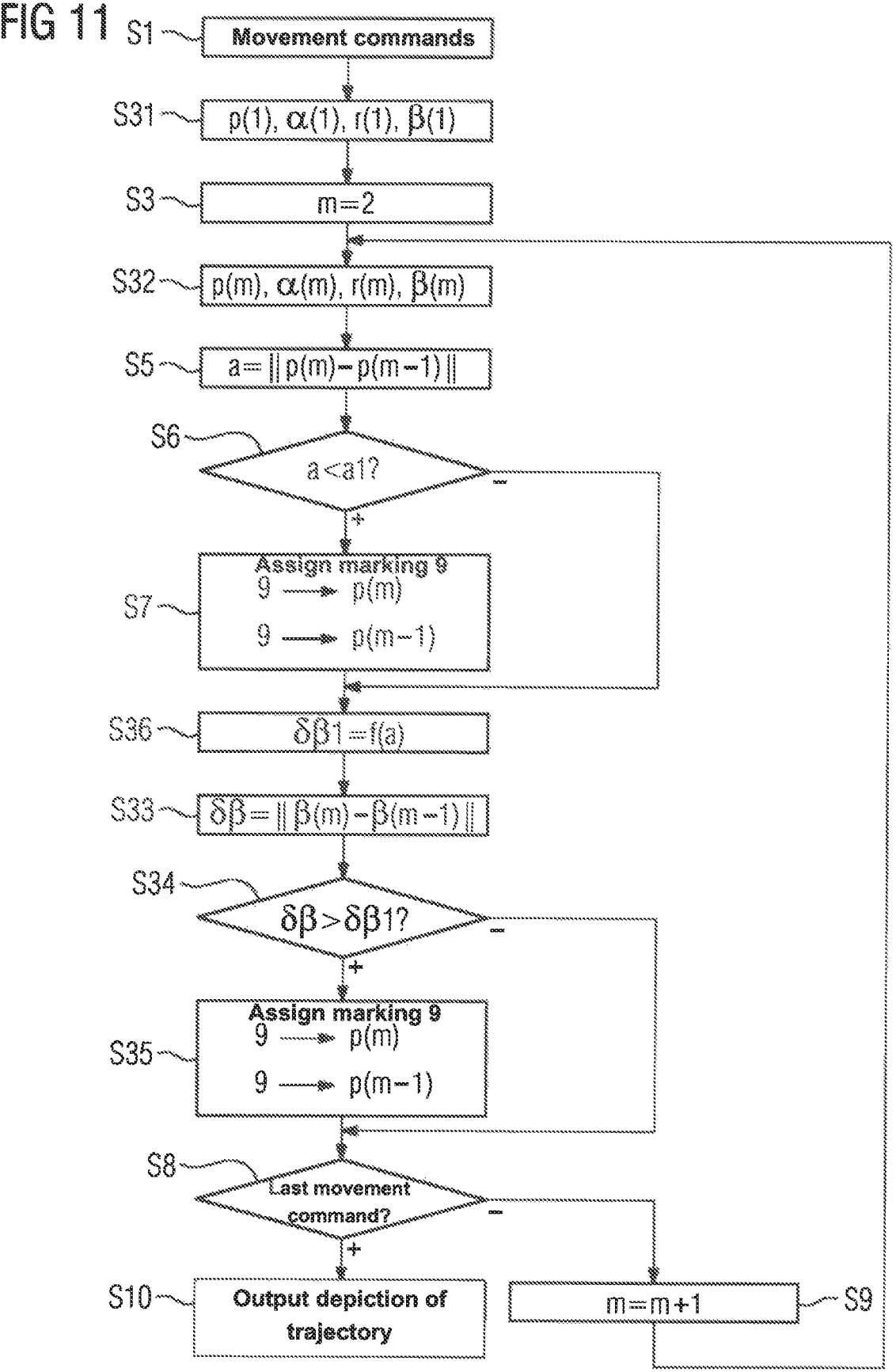

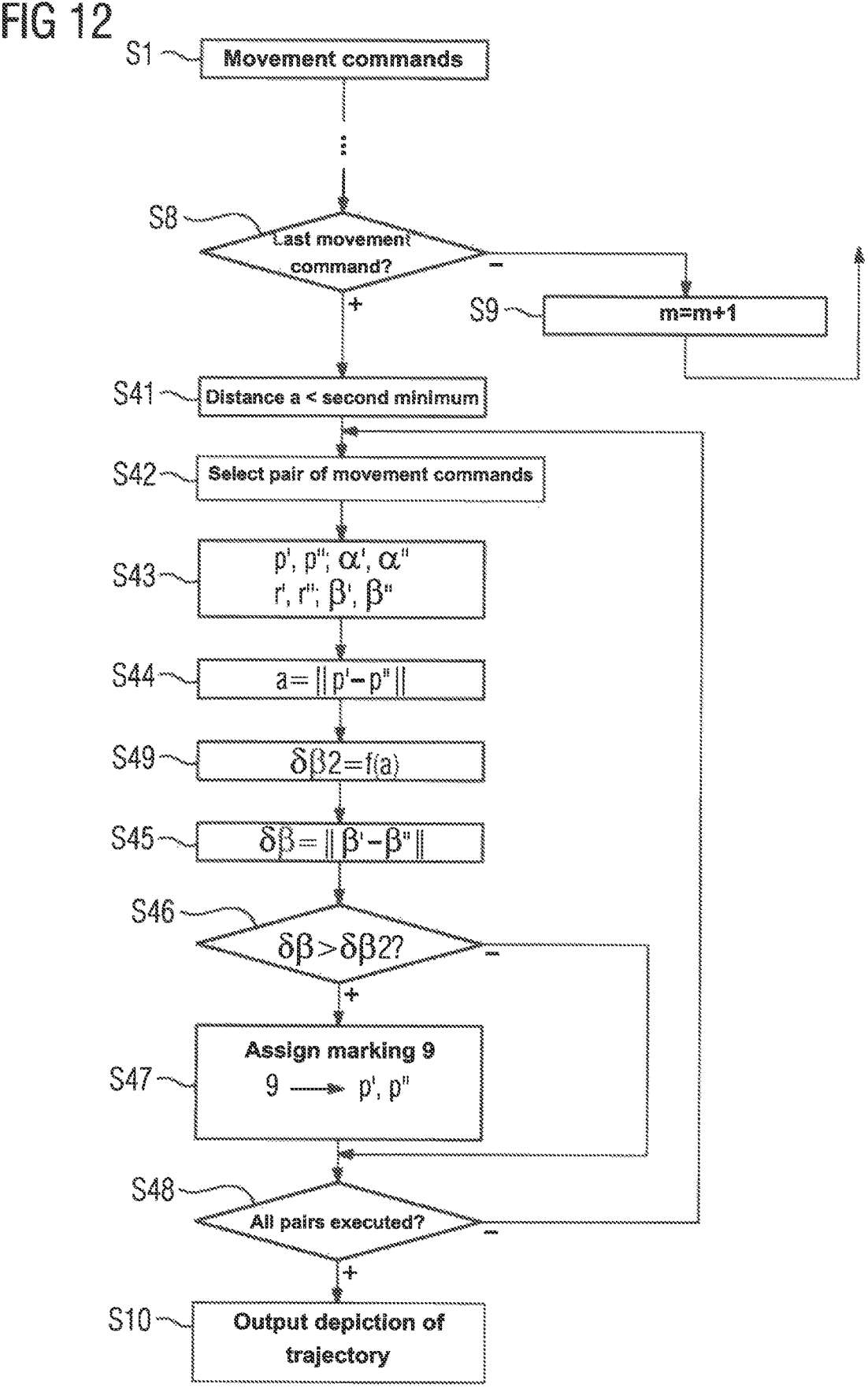

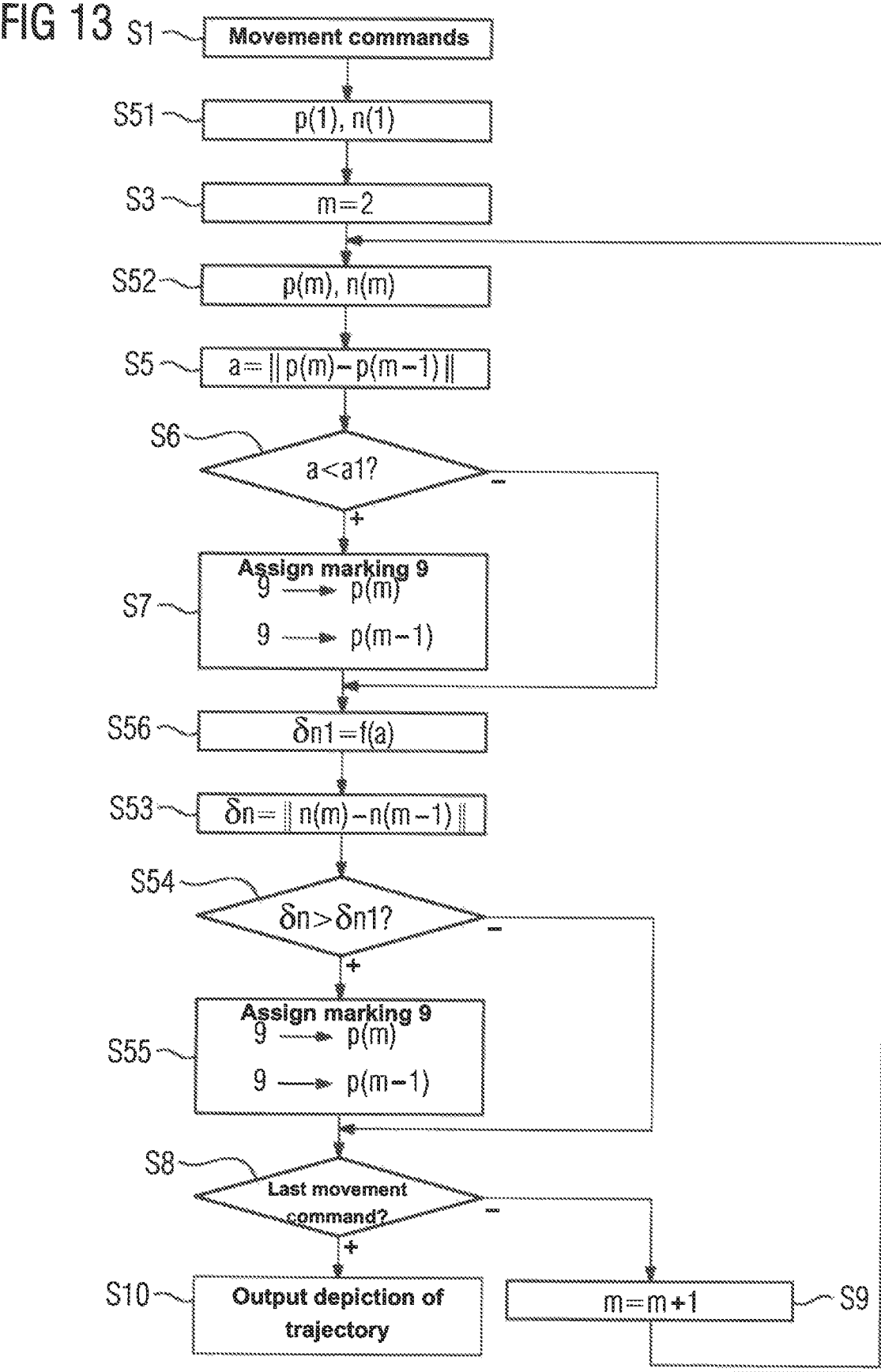

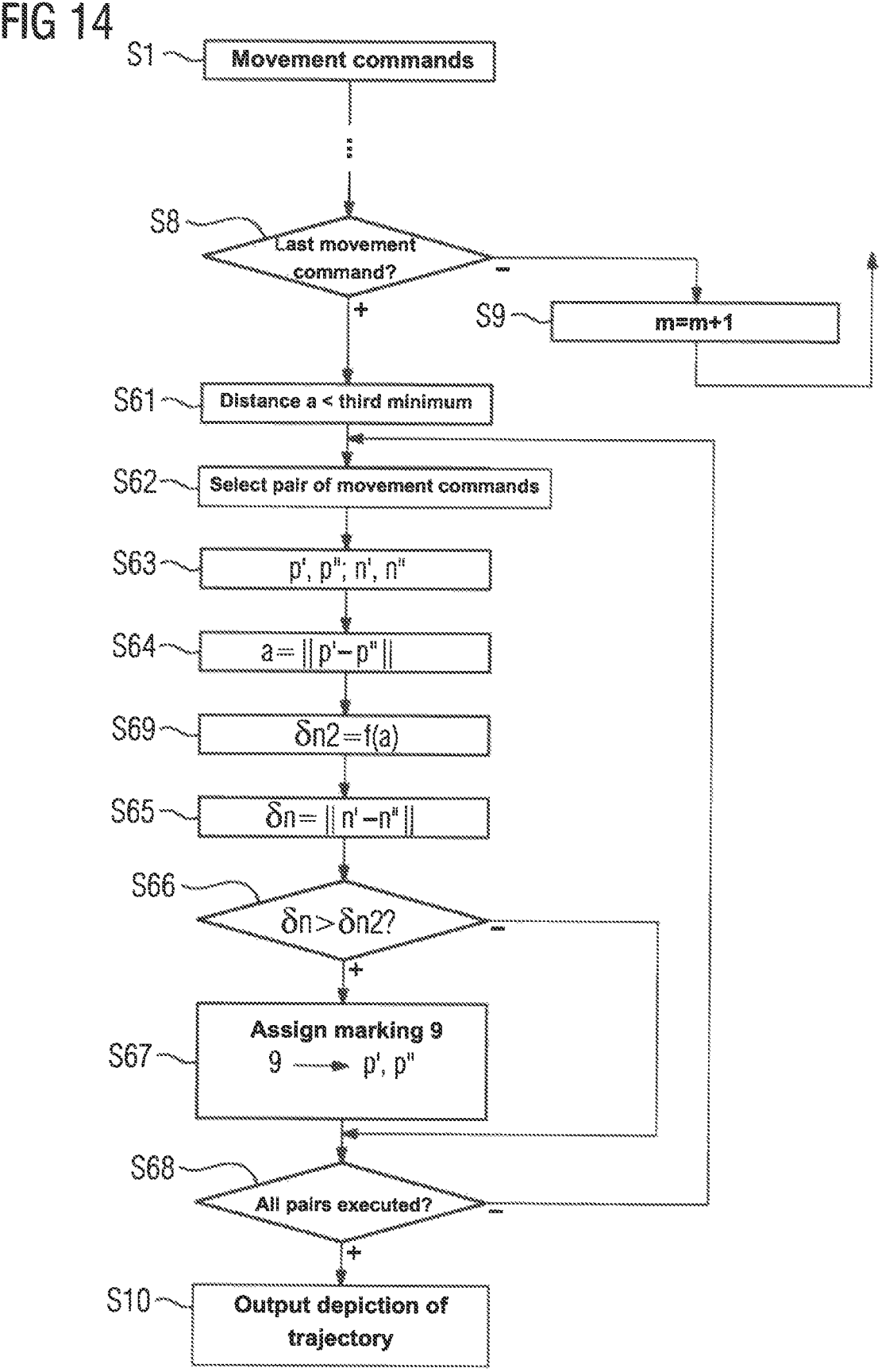

AUTOMATIC QUALITY EVALUATION FOR A SEQUENCE OF MOVEMENT COMMANDS

CROSS-REFERENCES TO RELATED APPLICATIONS

This application is the U.S. National Stage of International Application No. PCT/EP2017/071402, filed Aug. 25, 2017, which designated the United States and has been published as international Publication No. WO 2018/050423 and which claims the priority of European Patent Application, Serial No. 16188667.8, filed Sep. 13, 2016, pursuant to 35 U.S.C. 119(a)-(d).

BACKGROUND OF THE INVENTION

The invention relates to an evaluation method for a sequence of movement commands,
- wherein the movement commands each define a position to be adopted by a tool of a processing machine relative to a workpiece,
- wherein during the execution of the sequence of movement commands by a control device of the processing machine, the tool machines the workpiece at least intermittently,
- wherein the movement commands, during their execution by the control device of the processing machine, are converted into a trajectory including the defined positions,
- wherein a depiction of the trajectory defined by the sequence of movement commands is output to a user.

Within the scope of the present invention, "positions" means exclusively a translational positioning of the tool relative to the workpiece. If an orientation of the tool relative to the workpiece is meant, the corresponding term ("orientation") is also used. The term "position" can either be an exclusive translational positioning of the tool relative to the workpiece or a translational positioning of the tool relative to the workpiece, in which an orientation of the tool relative to the workpiece is additionally also set.

The present invention also starts from a computer program comprising machine code which can be executed by an arithmetic device, wherein the execution of the machine code by means of the arithmetic device causes the arithmetic device to execute such an evaluation method.

The present invention also starts from an arithmetic device, wherein the arithmetic device is programmed with a computer program such that it executes an evaluation method of this kind.

Within the framework of the creation of parts programs—in other words programs by means of which numerical control devices control processing machines, so that these machining operations can be carried out on workpieces—a CAD data set is generally created first of all (CAD=Computer Aided Design). The corresponding CAD data set defines the shape of the workpiece to be produced. However, it generally does not include any information about the machining processes required for this purpose. The CAD data set is therefore converted into a CAM data set by means of an arithmetic device (CAM=Computer Aided Manufacturing). The CAM data set defines the parts program to be executed later. It comprises a plurality of sequences of movement commands within the meaning of the present invention.

Theoretically, the conversion of the CAD data set into the CAM data set is perfect. The same applies to subsequent process steps. In practice, however, it can happen that subsequent machining of the workpiece leads to surface defects. The causes of such surface defects are diverse in nature. In particular, however, it can often no longer be possible to see on the workpiece which specific individual machining process has caused the respective surface defect.

A method for depicting, examining and optimizing a surface quality on the basis of CNC program data is known from EP 1 315 058 058 A1. In this method, the CNC program data describes track points of space curves. The associated normal vectors are determined and displayed for a plurality of adjacent track points. Normal vectors, which are directed substantially in the same direction, indicate regions of high surface quality, while normal vectors which point in (clearly) deviating directions indicate inaccuracies of the resulting surface.

The method of EP 1 315 058 A1 already leads to a significant improvement in the conversion of the CAD data set into the CAM data set. In particular, locations of the CAM data set which bring about an insufficient quality of the surface of the machined workpiece can be identified. However, the method of EP 1 315 058 A1 does not lead to the desired result in all cases.

The object of the present invention is to create an evaluation method with which the locations of the CAM data set, whose execution can lead to a reduced surface quality of the machine workpiece, can be reliably and comprehensively identified.

The object is achieved by an evaluation method having the features of claim 1. Advantageous embodiments of the evaluation method are the subject matter of dependent claims 2 to 13.

The object is achieved by an evaluation method of the type mentioned in the introduction and being inventively configured in that
- the distances between the positions of directly successive movement commands are ascertained,
- positions of directly successive movement commands, whose distance is below a predetermined minimum distance, are highlighted in the depiction by means of a marker.

Advantageous embodiments of the evaluation method are the subject matter of dependent claims.

This approach is based on the knowledge that, during the conversion of the CAD data set into the CAM data set, the support points (=defined positions), between which interpolation is carried out by the control device during the course of the execution of the sequence of movement commands, are generally far apart from each other for processing operations to be carried out without any problems. In the case of machining processes which are difficult to carry out, on the other hand, a large number of closely successive positions must be approached. Such facts often cause surface defects.

In some cases (for example in some three-axis machine tools) a movement of the tool relative to the workpiece is only possible in the three translational directions. In other cases (for example in the case of some five-axis machine tools) an adjustment of the orientation of the tool relative to the workpiece is also possible. In the last-mentioned cases, the movement commands also define an orientation to be adopted by the tool relative to the workpiece in addition to the respective position. Furthermore, in these cases the movement commands are converted during their execution by the control device of the processing machine in such a way that the tool adopts the corresponding orientation relative to the workpiece at the defined positions.

It is possible, even in such cases, to limit the evaluation to the position as such. Preferably, in such cases the method is, however, configured in that In addition, the change in the orientation of directly successive movement commands is determined and positions of directly successive movement commands, whose change in orientation is above a first maximum change, are highlighted by means of a marker.

It is possible for the first maximum change to be predetermined, in other words, always to have the same value. Preferably, however, the first maximum change is determined as a function of the distance between the positions of the respective directly successive movement commands.

An even more extensive evaluation of the orientations is also possible. In particular it is possible that pairs of movement commands, whose respective position is below a predetermined first minimum distance, are respectively determined for the positions to be adopted by the tool, that the difference in the orientations to be adopted by the tool relative to the workpiece is determined for the pairs of movement commands, and that positions of pairs of movement commands, in which the difference in the orientations is above a second maximum change, are highlighted by means of a marker.

This type of evaluation leads to an even more comprehensive evaluation of the movement commands.

Analogously to the first maximum change, it is possible that the second maximum change is determined as a function of the distance between the positions of the two movement commands of the respective pair of movement commands.

As a rule, the movement commands, in addition to the respective position, not only define an orientation to be adopted by the tool relative to the workpiece, but also a respective direction of movement. In particular, the movement commands are converted during their execution by the control device of the processing machine in such a way that the tool not only adopts the corresponding orientation relative to the workpiece at the defined positions, but also in the corresponding direction of movement. In this case, the evaluation method is preferably designed in such a way that for the positions to be adopted by the tool, in addition the cross product in the direction of movement and the orientation respectively is determined, the change in the direction of the cross product of directly successive movement commands is determined and positions of directly successive movement commands, whose change in the direction of the cross product is above a third maximum change, are highlighted by means of a marker.

This type of evaluation leads to an even more comprehensive evaluation of the movement commands.

Analogously to the first maximum change it is possible that the third maximum change is determined as a function of the distance between the positions of the respective directly successive movement commands.

Just as with the orientations, it is possible that pairs of movement commands, whose respective position is below a predetermined second minimum distance, are respectively determined for the positions to be adopted by the tool, the difference in the directions of the cross product is determined for the pairs of movement commands, and positions of pairs of movement commands in which the difference in the directions of the cross products is above a fourth maximum change are highlighted by means of a marker.

This type of evaluation leads to an even more comprehensive evaluation of the movement commands.

Analogously to the second maximum change it is possible that the fourth maximum change is determined as a function of the distance between the positions of the two movement commands of the respective pair of movement commands.

If the movement commands, in addition to the respective position, define an orientation to be adopted by the tool relative to the workpiece and a respective direction of movement, the evaluation method can also be designed in such a way that using the direction of movement and the orientation, in addition a normal vector oriented orthogonally to the surface of the workpiece at the respective position is determined for the positions to be adopted by the tool, the change in the direction of the normal vector of directly successive movement commands is determined and positions of directly successive movement commands, whose change in direction of the normal vector is above a fifth maximum change, are highlighted by means of a marker.

Analogously to the first maximum change it is possible that the fifth maximum change is determined as a function of the distance between the positions of the respective directly successive movement commands.

Furthermore, it is additionally possible in this case that pairs of movement commands, whose respective position is below a predetermined third minimum distance, are respectively determined for the positions to be adopted by the tool, the difference in the directions of the normal vectors is determined for the pairs of movement commands and positions of pairs of movement commands in which the difference in the directions of the normal vectors is above a sixth maximum change are highlighted by means of a marker.

Analogously to the first maximum change it is possible that the sixth maximum change is determined as a function of the distance between the positions of the respective directly successive movement commands.

The object is further achieved by a computer program including machine code which can be executed by an arithmetic device, in such a way that the execution of the computer program by means of the arithmetic device causes the arithmetic device to execute an inventive evaluation method.

The object is further achieved by an arithmetic device which is programmed with an inventive computer program so it executes an inventive evaluation method during operation.

BRIEF DESCRIPTION OF THE DRAWING

The above-described properties, features and advantages of this invention and the manner in which they are achieved will become clearer and more understandable in connection with the following description of the exemplary embodiments which are explained in more detail in conjunction with the drawings. Schematically in the drawings:

FIG. 10 shows a flow chart,

FIG. 11 shows a flow chart,

FIG. 12 shows a flow chart,

FIG. 13 shows a flow chart, and

FIG. 14 shows a flow chart.

DETAILED DESCRIPTION OF THE PREFERRED EMBODIMENTS

Figure 1:
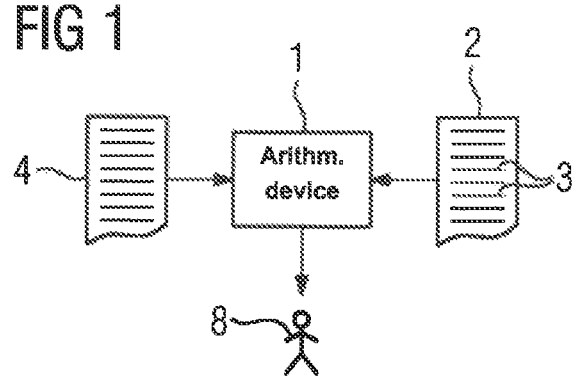
FIG. 1 shows an arithmetic device.

According to FIG. 1, an arithmetic device 1 is programmed with a computer program 2. The computer program 2 comprises machine code 3 which can be executed by the arithmetic device 1. Processing of the machine code 3 by the arithmetic device 1 causes the arithmetic device 1 to execute an evaluation method which is explained in more detail below in conjunction with FIG. 2 and the further figures.

Figure 2:
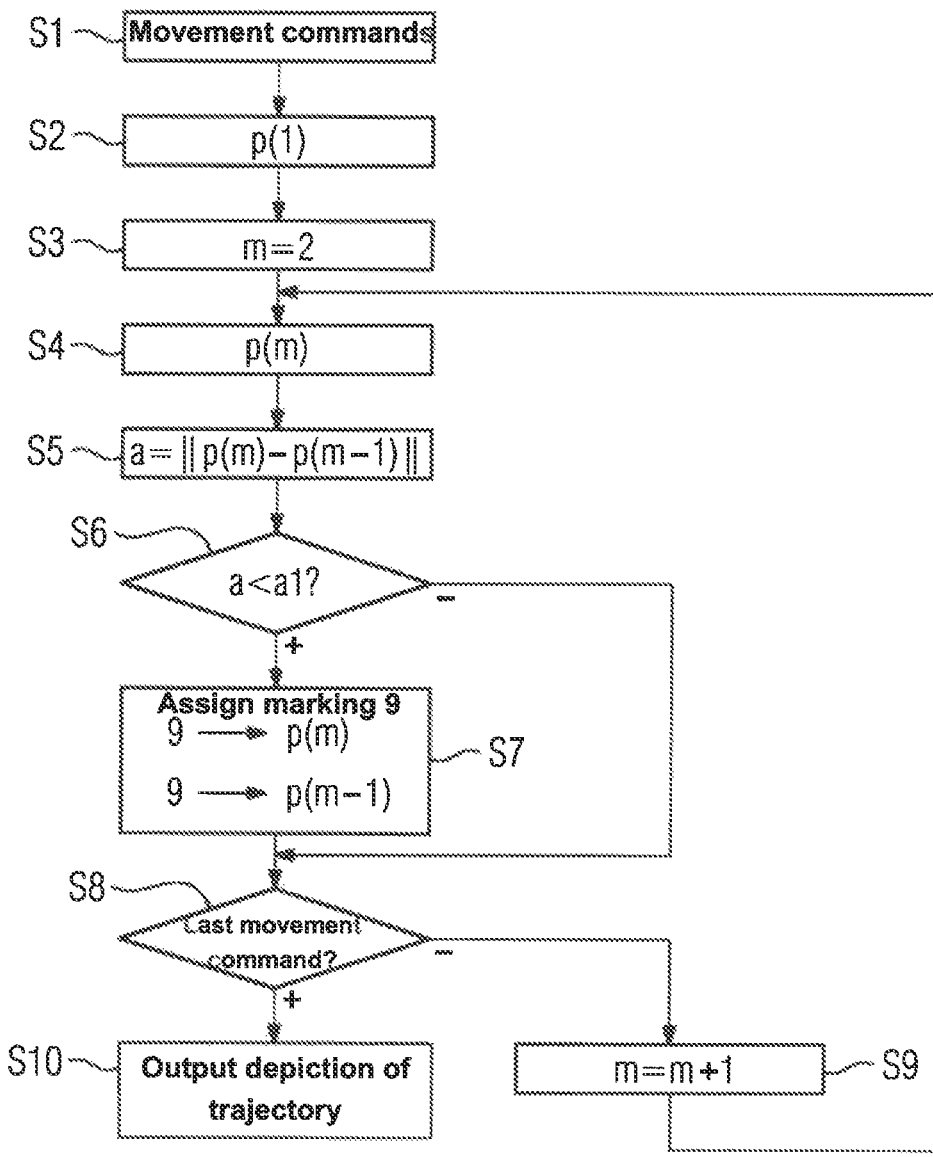
FIG. 2 shows a flow chart.

According to FIG. 2, a sequence of movement commands is known to the arithmetic device 1 in a step S1. For example, a parts program 4 (see FIG. 1) which comprises the sequence can be known to the arithmetic device 1 in step S1.

Figure 3:
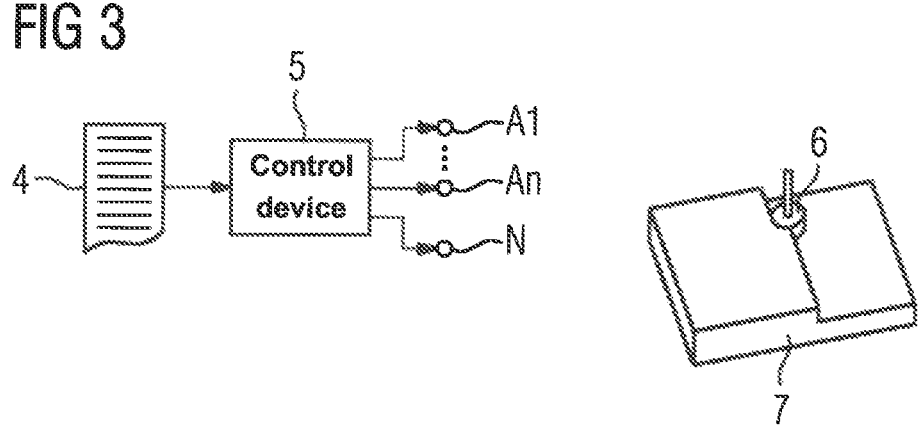
FIG. 3 shows a processing machine.

According to FIG. 3, the parts program 4 and therewith also the sequence of movement commands are also associated with a control device 5 (for example a numerical control) which can execute the parts program 4 and therewith also the sequence of movement commands. The control devices 5 can be identical to the arithmetic device 1. It is also possible for the control device 5 and the arithmetic device 1 to be combined in an integral unit. However, the control device 5 can also be a device different from the arithmetic device 1.

Figure 4:
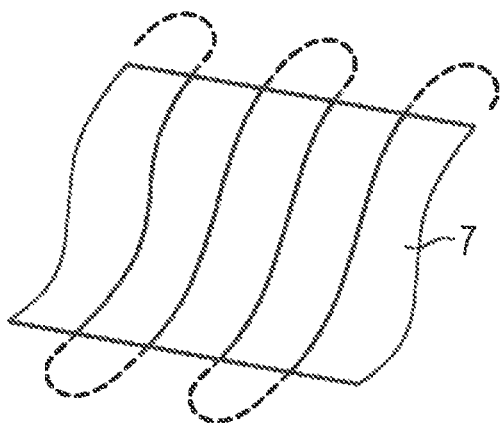
FIG. 4 a workpiece and trajectories defined by sequences of movement commands.
Figure 5:
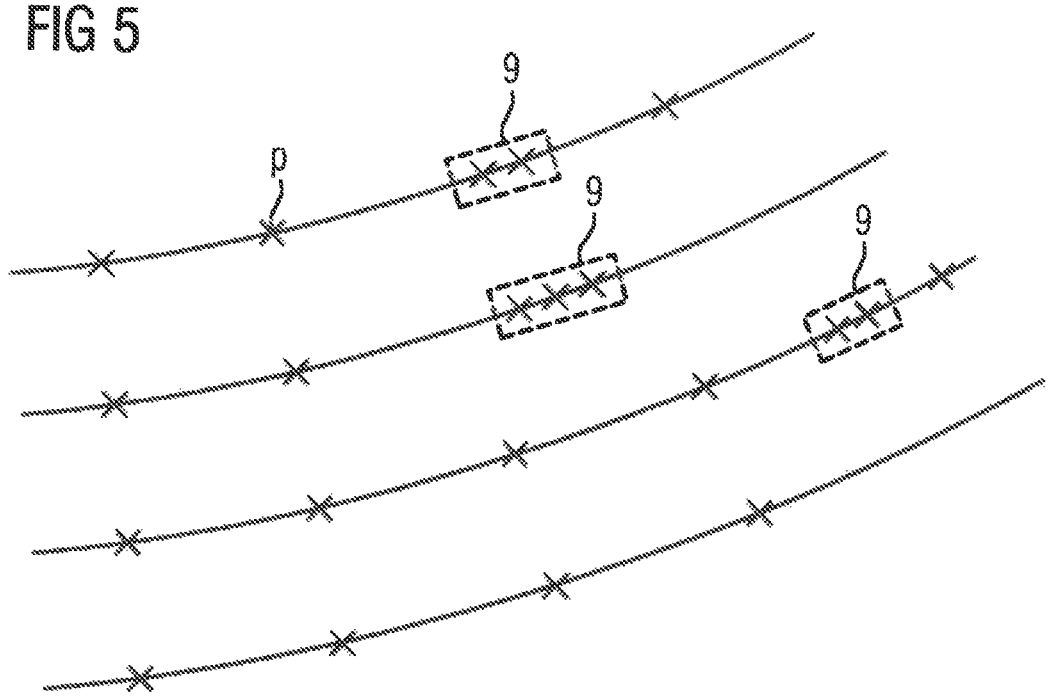
FIG. 5 shows trajectories.

During the course of the execution of the parts program 4, the control device 5 determines, for a plurality of position-controlled axes A1 to An of the processing machine, in each case the corresponding desired value for the respective position-controlled axis A1 to An and controls the position-controlled axes A1 to An according to the corresponding desired values. As a result, a tool 6 of the processing machine is at least translationally positioned relative to a workpiece 7, optionally additionally also oriented. The movement commands therefore define a position p to be respectively adopted by a tool 6 relative to the workpiece 7. Purely by way of example, FIGS. 4 and 5 show some positions p of this kind in solid lines. The number n of position-controlled axes A1 to An is generally at least three. If necessary, one or more rotational speed-controlled axes N can additionally be controlled by the control device 5.

The control of the position-controlled axes A1 to An, and therefore the execution of the sequence of movement commands, by the control device 5 of the processing machine has the effect that, as can be seen in particular by the depiction in FIGS. 3 and 4, during the execution of the sequence of movement commands, the tool 6 at least temporarily machines the workpiece 7 by means of the control device 5. For example, the tool 6 can be engaged with the workpiece during these times. However, contact-free machining is also possible, for example a laser inscription.

Furthermore, it can be seen from FIGS. 4 and 5 that, during execution by the control device 5, the movement commands are converted into a trajectory, which contains the defined positions p. The positions p are not shown individually in FIG. 4. In FIG. 5 they are partially symbolized by small crosses.

In a step S2, the arithmetic device 1 selects the first movement command of the sequence of movement commands under consideration and determines the associated position p(1). In a step S3 the arithmetic device 1 sets an index m to the value 2. The $m^{th}$ movement command of the sequence of movement commands is also sometimes referred to as the reference character m in the following.

In a step S4 the arithmetic device 1 selects the $m^{th}$ movement command of the sequence under consideration and determines the associated position p(m). In a step S5 the arithmetic device 1 determines the distance a of the position p(m) of the $m^{th}$ movement command from the position p(m-1) of the m-$1^{th}$ movement command. For example, the normal geometric (Euclidian) distance can be determined in step S5. Alternatively, the distance a can be determined by means of another type of standard. In a step S6 the arithmetic device 1 checks whether the determined distance a is below a predetermined minimum distance a1. If this is the case, the arithmetic device 1 assigns a respective marker 9 in a step S7 to at least one of the two relevant positions—in other words either the position p(m) of the $m^{th}$ movement command or the position p(m-1) of the m-$1^{th}$ movement command. The marker 9 is preferably assigned to both relevant positions p(m), p(m-1). Otherwise, step S7 is skipped.

In a step S8 the arithmetic device 1 checks whether it has already reached the last movement command of the sequence under consideration. If this is not the case, in a step S9 the arithmetic device 1 increases the index m and then returns to step S4. Otherwise, the procedure of FIG. 2 is almost complete. In particular, the arithmetic device 1 skips only to a step S10 in which the arithmetic device 1 outputs a depiction of the trajectory defined by the sequence of movement commands to a user 8 (see FIG. 1). Within the sequence, those positions p whose distance a is below the minimum distance a1 are highlighted by means of a marker 9. For example, the corresponding positions p can be bordered in accordance with the depiction in FIG. 5. Other types of depiction are also possible. For example, the corresponding positions p can be displayed in a flashing manner or be displayed in a different color to the other positions p.

Figure 6:
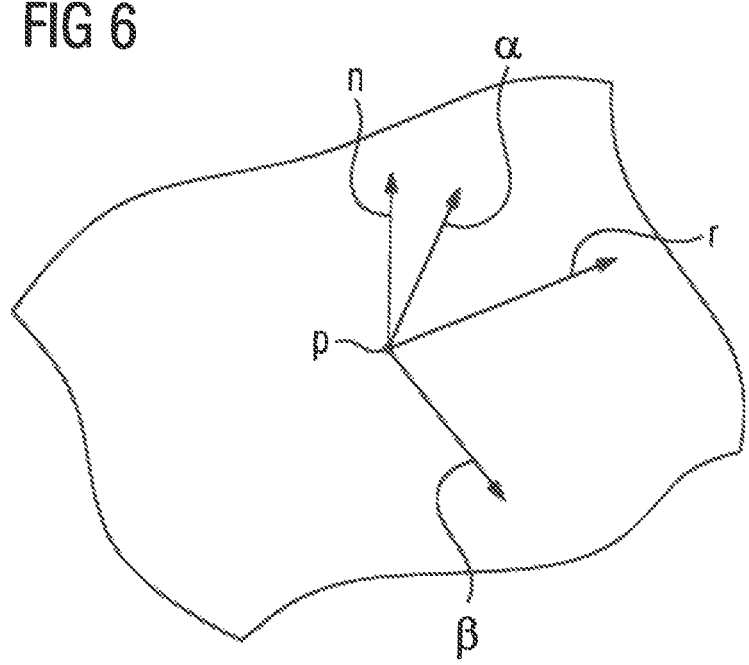
FIG. 6 shows a workpiece, a tool and different directions.

Owing to the movement of the tool 6 relative to the workpiece 7, the movement commands, in accordance with the depiction in FIG. 6, also define a respective direction of movement r in addition to the respective position p. The movement commands are therefore converted during their execution by the control device 5 of the processing machine such that the tool 6 is moved relative to the workpiece 7 at the defined positions p in the corresponding direction of movement r.

In many cases the movement commands in accordance with the depiction in FIG. 6 also define, in addition to the respective position p, an orientation α to be adopted by the tool 6 relative to the workpiece 7. In this case the movement commands are additionally converted during their execution by the control device 5 of the processing machine in such a way that the tool 6 adopts the corresponding orientation α relative to the workpiece 7 at the defined positions p.

More extensive evaluations are possible if the movement commands also define the orientation α of the tool 6 relative to the workpiece 7.

Therefore, for example, it is possible to modify the procedure of FIG. 2 in such a way as is explained in more detail below in conjunction with FIG. 7.

Figure 7:
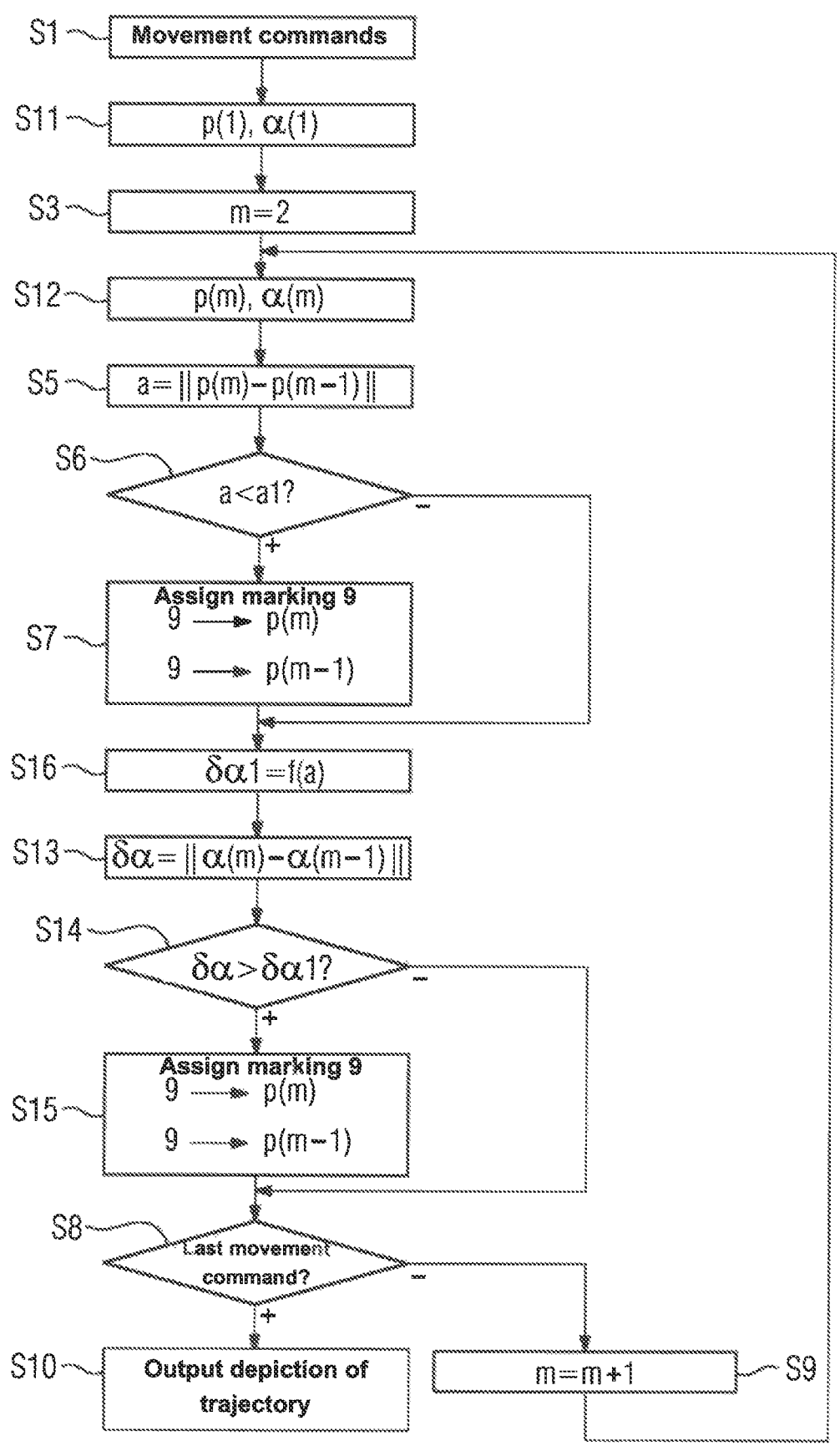
FIG. 7 shows a flow chart.

FIG. 7 expands on the procedure of FIG. 2. In particular, the procedure according to FIG. 7 also comprises steps S1, S3 and S5 to S10. These steps will therefore not be explained again.

Steps S2 and S4 are replaced by steps S11 and S12. In step S11 the arithmetic device 1 selects—analogously to step S2 of FIG. 2—the first movement command of the sequence of movement commands under consideration and determines the associated position p(1). In addition, in step S11 the arithmetic device 1 determines the associated orientation α(1) of the tool 6 relative to the workpiece 7 for the position p(1) of the first movement command. In a similar manner, in step S12 the arithmetic device 1 selects—analogously to step S4 of FIG. 2—the m movement command of the sequence under consideration in step S12 and determines the associated position p(m). In addition, the arithmetic device 1 determines the associated orientation α(m) of the tool 6 relative to the workpiece 7 for the position p(m) of the m movement command.

Furthermore, additional steps S13 to S15 are present. In step S13 the arithmetic device 1 determines the change δα in orientation α(m), α(m−1) of directly successive movement commands m−1, m. In step S14 the arithmetic device 1 checks whether the determined change δα is above a first maximum change 501. If this is the case, in step S15 the arithmetic device 1 assigns a respective marker 9 to at least one of the two respective positions—In other words either the position p(m) of the m$^{th}$ movement command or the position p(m−1) of the m−1$^{th}$ movement command. The marker 9 is preferably assigned to both relevant positions p(m), p(m−1). Otherwise, step S15 is skipped.

Due to the presence of steps S11 to S15, during the course of the execution of step S10 not only those positions p whose distance a is below the minimum distance a1 are therefore highlighted by means of a marker 9. Rather, the positions p whose change δα in orientation is above the first maximum change 501 are additionally also highlighted by means of a marker 9. As before, for example within the respective sequence, the corresponding positions p can be bordered in accordance with the depiction in FIG. 5. Other types of depiction are also possible. For example, the corresponding positions p can be displayed in a flashing manner or be displayed in another color. The type of marker can be the same as previously for the distances a but can alternatively be another marker.

In the simplest case the first maximum change 501 is a strictly predefined value. Preferably, however, a step S16 is additionally present in accordance with the depiction in FIG. 7. In this case, in step S16 the arithmetic device 1 determines the first maximum change δα1 as a function of the distance a between the positions p(m), p(m−1) of the two directly successive movement commands m, m−1.

Figure 8:
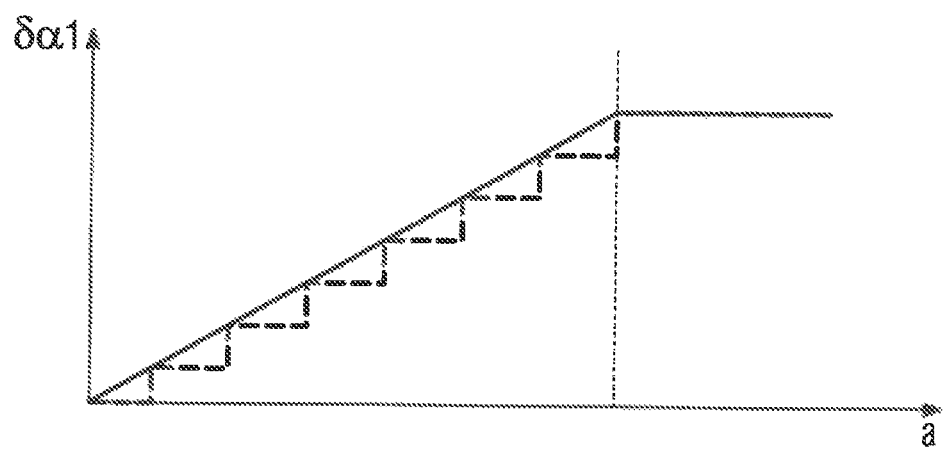
FIG. 8 shows possible functional profiles.
Figure 9:
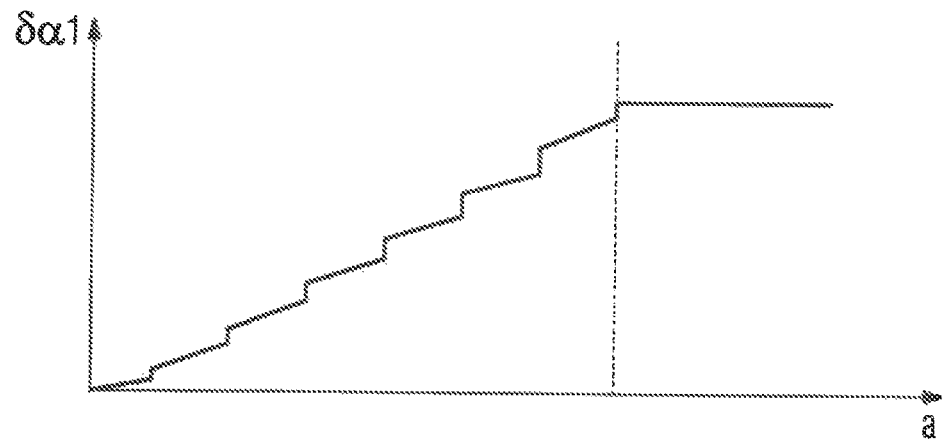
FIG. 9 shows a possible functional profile.

Within the scope of step S16, for example in accordance with the depiction in FIGS. 8 and 9, the first maximum change δα1 can have a maximum value as long as the distance a between the positions p(m), p(m−1) of the two directly successive movement commands m, m−1 is above a predetermined first limit distance. The maximum value can be 180°, for example. However, it can also have a different value. However, if the distance a becomes smaller, the first maximum change δα1 is also reduced, starting from the maximum value. It is possible for the first maximum change δα1 to decrease in a strictly monotonous manner as the distance a decreases. This is illustrated in solid lines in FIG. 8. Alternatively, it is possible for the first maximum change δα1 to be reduced in sections as the distance a decreases.

This is illustrated in broken lines in FIG. 8. According to the depiction in FIG. 9, the combination of these two measures is also possible.

The procedure of FIG. 7 can be expanded further. This is explained in more detail below in conjunction with FIG. 10.

According to FIG. 10—in addition to the steps of FIG. 7—steps S21 to S28 are present.

In step S21 for each position p, the arithmetic device 1 determines those positions p whose distance a is below a predetermined first minimum distance a2. The arithmetic device 1 stores the associated movement commands as a respective pair of movement commands.

In step S22 the arithmetic device 1 selects one of the pairs of movement commands. In step S23 the arithmetic device 1 determines the associated positions p for the selected pair of movement commands, hereinafter referred to as p' and p". Furthermore, in step S23 the arithmetic device 1 determines the associated orientations α for the selected pair of movement commands, hereinafter referred to as α' and α". In step S24 the arithmetic device 1 determines the distance a between the two positions p', p". In step S25 the arithmetic device 1 determines the difference δα in the orientations α', α", moreover.

In step S26 the arithmetic device 1 checks whether the determined difference δα is above a second maximum change δα2. If this is the case, in step s27 the arithmetic device assigns a respective marker 9 to the two relevant positions p' and p". Otherwise, step S27 is skipped.

In step S28, the arithmetic device 1 checks whether it has already executed steps S22 to S27 for all pairs of movement commands determined in step S21. If this is not the case, the arithmetic device 1 returns to step S22. With the renewed execution of step S22, a different pair of movement commands is of course selected for which steps S23 to S27 have not yet been carried out. Otherwise, the procedure of FIG. 10 is completed. In particular, the arithmetic device 1 skips only to step S10 in which the arithmetic device 1 outputs the depiction of the trajectory defined by the sequence of movement commands to the user 8.

Owing to the presence of steps S21 to S28, during the course of the execution of step S10, the positions p', p", in which the difference δα in the orientations α' and α" is above the second maximum change δα2, are therefore additionally also highlighted by means of a marker 9. As before, for example the corresponding positions p', p" can be bordered in accordance with the depiction in FIG. 5. Other types of depiction are also possible. For example, the corresponding positions p', p" can be displayed in a flashing manner or be displayed in a different color.

The type of marker can be the same as previously for the distances a but can alternatively be another marker.

In the simplest case the second maximum change δα2 is a strictly predefined value. Preferably, however, a step S29 is additionally present in accordance with the depiction in FIG. 8. In this case, in step S29 the arithmetic device 1 determines the second maximum change δα2 as a function of the distance a between the positions p', p" of the two movement commands of the respective pair of movement commands. The above statements relating to the type of dependence of the first maximum change δα1 on the distance a of the positions p(m), p(m−1) of directly successive movement commands can also be applied in an analogous manner to the second maximum change δα2. The second maximum change δα2, viewed as a function of the distance a, can have the same profile as the first maximum change δα1. However, this is not absolutely necessary.

If the movement commands also define the orientation α of the tool 6 relative to the workpiece 7, other evaluations are also possible. These evaluations can be carried out alternatively or in addition to the evaluations according to FIG. 7 or FIG. 10. This other evaluation is explained in more detail below in conjunction with FIG. 11.

FIG. 11 expands—just as in FIG. 7—on the procedure of FIG. 2. In particular, the procedure according to FIG. 11 also comprises steps S1, S2 and S5 to S10. These steps are therefore not explained again.

Steps S2 and S4 are replaced by steps S31 and S32. In step S31 the arithmetic device 1 selects—analogously to step S2 of FIG. 2—the first movement command of the sequence of movement commands under consideration and determines the associated position p(1). In addition, in step S31 the arithmetic device 1 determines the associated orientation (α1) of the tool 6 relative to the workpiece 7 for the position p(1) of the first movement command. Furthermore, in step S31 the arithmetic device 1 determines the associated direction of movement r(1) for the position p(1). Finally, in step S31 the arithmetic device 1 determines the cross-product β(1) of the direction of movement r(1) and the orientation (α1). The cross product β(1) therefore indicates a direction which is orthogonal to the direction of movement r(1) of the tool 6 at the position p(1) and orthogonal to the orientation α(1) of the tool 6 at the position p(1). Step S32 corresponds in content to step S31, but is executed in relation to the m$^{th}$ movement command of the sequence under consideration.

Furthermore, additional steps S33 to S35 are present. In step S33 the arithmetic device 1 determines the change δβ in the cross product β(m−1), β(m) of the two directly successive movement commands m−1, m. In step S34 the arithmetic device 1 checks whether the determined change δβ is above a third maximum change 6131. If this is the case, in step S35 the arithmetic device 1 assigns a marker 9 to at least one of the two relevant positions—in other words either the position p(m) of the m$^{th}$ movement command or the position p(m−1) of the m−1$^{th}$ movement command. The marker 9 is preferably assigned to both relevant positions p(m), p(m−1). Otherwise, step S35 is skipped.

Owing to the presence of steps S31 to S35, during the course of the execution of step S10, the directly successive positions p whose change δβ in the cross product β(m), β(m−1) is above the third maximum change δβ1 are therefore additionally also highlighted by means of a marker 9. As before, for example within the respective sequence, the corresponding positions p can be bordered in accordance with the depiction in FIG. 5. Other types of depiction are also possible. For example, the corresponding positions p can be displayed in a flashing manner or be displayed in a different color. The type of marker can be the same as before. However, it can alternatively be another marker.

In the simplest case the third maximum change δβ1 is a strictly predefined value. Preferably, however, a step S36 is additionally present in accordance with the depiction in FIG. 11. In this case, in step S36 the arithmetic device 1 determines the third maximum change δβ1 as a function of the distance a between the positions p(m), p(m−1). The above statements relating to the type of dependence of the first maximum change δα1 on the distance a of the positions p(m), p(m−1) of directly successive movement commands can also be applied in an analogous manner to the third maximum change δβ1. The third maximum change δβ1—viewed as a function of the distance a—can have the same profile as the first or the second maximum change δα1, δα2. However, this is not absolutely necessary.

The procedure of FIG. 11 can be expanded further. This is explained in more detail below in conjunction with FIG. 12.

According to FIG. 12—in addition to the steps of FIG. 11—steps S41 to S48 are present.

In step s41 the arithmetic device 1 determines for each position p, the positions whose distance a is below a predetermined second minimum distance a3. The arithmetic device 1 stores the associated movement commands as a respective pair of movement commands.

In step S42 the arithmetic device 1 selects one of the pairs of movement commands. In step S43 the arithmetic device 1 determines the associated positions p for the selected pair of movement commands, hereinafter referred to as p' and p". Furthermore, in step S43 the arithmetic device 1 determines the associated orientations α for the selected pair of movement commands, hereinafter referred to as α' and α". In step S43 the arithmetic device 1 also determines the associated directions r for the selected pair of movement commands, hereinafter referred to as r' and r". Finally, in step S43 the arithmetic device 1 determines the associated cross products β for the selected pair of movement commands, hereinafter referred to as β' and β".

In step S44 the arithmetic device 1 determines the distance a between the two positions p' and p". Furthermore, in step S45 the arithmetic device 1 determines the difference 65 in the cross products β' and β".

In step S46 the arithmetic device 1 checks whether the detected difference δβ is above a fourth maximum change δβ 2. If this is the case, in step S47 the arithmetic device assigns a respective marker 9 to the two relevant positions p' and p". Otherwise, step S47 is skipped.

In step S48 the arithmetic device 1 checks whether it has already executed steps S42 to S47 for all pairs of movement commands determined in step S41. If this is not the case, the arithmetic device 1 returns to step S42. With the renewed execution of step S42 a different pair of movement commands is of course selected, for which the steps S43 to S47 have not yet been carried out. Otherwise, the procedure of FIG. 12 is completed. In particular, the arithmetic device 1 skips only to step S10 in which the arithmetic device 1 outputs the depiction of the trajectory defined by the sequence of movement commands to the user 8.

Owing to the presence of steps S41 to S48, during the course of the execution of step S10 the positions p', p", in which the difference 61 in the cross products β' and β" Is above the fourth maximum change 612, are therefore additionally also highlighted by means of a marker 9. As before, for example the corresponding positions p', p", can be bordered in accordance with the depiction in FIG. 5. Other types of depiction are also possible. For example, the corresponding positions p', p" can be displayed in a flashing manner or be displayed in a different color. The type of marker can be the same as previously for the distances a but can alternatively be another marker.

In the simplest case the fourth maximum change δβ2 is a strictly predefined value. Preferably, however, a step S49 is additionally present in accordance with the depiction in FIG. 8. In this case, n step S49 the arithmetic device 1 determines the fourth maximum change δβ2 as a function of the distance a between the positions p', p" of the two movement commands of the respective pair of movement commands. The above statements relating to the type of dependence of the first maximum change δα1 on the distance a of the positions p(m), p(m−1) of directly successive movement commands can also be applied in an analogous manner to the fourth maximum change δβ2. The fourth maximum change $\delta\beta 2$—viewed as a function of the distance a—can have the same profile as the first, the second or the third maximum change $\delta\alpha 1$, $\delta\alpha 2$, $\delta\beta 1$. However, this is not absolutely necessary.

Furthermore, it is possible to modify the procedure of FIG. 2 in such a way as is explained in more detail below in conjunction with FIG. 13.

FIG. 13 expands on the procedure of FIG. 2. In particular, the procedure according to FIG. 7 also comprises steps S1, S3 and S5 to S10. These steps are therefore not explained again.

Steps S2 and S4 are replaced by steps S51 and S52. In step S52, the arithmetic device 1—analogously to step S2 of FIG. 2—selects the first movement command of the sequence of movement commands under consideration and determines the associated position p(1). In addition, in step S11 the arithmetic device 1 determines a normal vector n(1) for the position p(1) of the first movement command. The normal vector n(1) is oriented orthogonally to the surface of the workpiece 7 at the position p(1) in accordance with the depiction in FIG. 6. The normal vector n(1) can be determined on the basis of the direction of movement r(1) and the orientation $\alpha$(1). For example, starting from the cross product $\beta$(1), the cross product with the direction of movement r(1) can be determined once again. The resulting vector corresponds to the normal vector n(1) after a standardization to a predetermined length. Alternatively, the component of the orientation $\alpha$(1) which is directed parallel to the direction of movement r(1) can be subtracted from the orientation $\alpha$(1). After standardization to the predetermined length the result of the subtraction likewise corresponds to the normal vector n(1). The step S52 corresponds in content to step S51 but is executed in relation to the m$^{th}$ movement command of the sequence under consideration.

Furthermore, additional steps S53 to S55 are present. In step S53 the arithmetic device 1 determines the change $\delta$n in the normal vectors n(m), n(m−1) of directly successive movement commands m−1, m. In step S54 the arithmetic device 1 checks whether the determined change $\delta$n is above a fifth maximum change $\delta\eta 1$. If this is the case, in step S55 the arithmetic device 1 assigns a respective marker 9 to at least one of the two relevant positions—in other words either the position p(m) of the m$^{th}$ movement command or the position p(m−1) of the m−1$^{th}$ movement command. The marker 9 is preferably assigned to the two relevant positions p(m), p(m−1). Otherwise, step S55 is skipped.

On the basis of the presence of steps S51 to S55, during the course of execution of step S10 in addition, therefore, the positions p whose change $\delta$n in the normal vector n is above the fifth maximum change $\delta$n1 are also highlighted by means of a marker 9. As before, for example within the respective sequence, the corresponding positions p can be bordered in accordance with the depiction in FIG. 5. Other types of depiction are also possible. For example, the corresponding positions p can be displayed in a flashing manner or be displayed in another color. The type of marker can be the same as previously for the distances a but can alternatively be another marker.

In the simplest case the fifth maximum change $\delta$n1 is a strictly predefined value. Preferably, however, a step S56 is additionally present in accordance with the depiction in FIG. 13. In this case, in step S56 the arithmetic device 1 determines the fifth maximum change $\delta$n as a function of the distance a of the positions p(m), p(m−1) of the two directly successive movement commands m, m−1. The fifth maximum change $\delta\beta 1$—as a function of the distance a—can have the same profile as one of the other maximum changes $\delta\alpha 1$, $\delta\alpha 2$, $\delta\beta 1$, $\delta\beta 2$. However, this is not absolutely necessary.

The procedure of FIG. 13 can be expanded even further. This is explained in more detail below in conjunction with FIG. 14.

According to FIG. 14—in addition to the steps of FIG. 13—steps S61 to S68 are present.

In step S61 the arithmetic device 1 determines for each position p, the positions p whose distance a is below a predetermined third minimum distance a4. The arithmetic device 1 stores the associated movement commands as a respective pair of movement commands.

In step S62 the arithmetic device 1 selects one of the pairs of movement commands. In step S63 the arithmetic device 1 determines the associated positions p for the selected pair of movement commands, hereinafter referred to as p' and p". Furthermore, in step S63 the arithmetic device 1 determines the associated normal vectors n for the selected pair of movement commands, hereinafter referred to as n' and n". In step S64 the arithmetic device 1 determines the distance a between the two positions p', p'. In step S65 the arithmetic device 1 determines the difference $\delta$n in the normal vectors n', n".

In step S66 the arithmetic device 1 checks whether the determined difference an is above a sixth maximum change n2. If this is the case, in step S67 the arithmetic device 1 assigns a respective marker 9 to the two relevant positions p' and p". Otherwise, step s67 is skipped.

In step S68, the arithmetic device 1 checks whether it has already executed steps S62 to S67 for all pairs of movement commands determined in step S61. If this is not the case, the arithmetic device 1 returns to step S62. With the renewed execution of step S62, a different pair of movement commands is of course selected, for which steps S63 to S67 have not yet been carried out. Otherwise, the procedure of FIG. 10 is completed. In particular, the arithmetic device 1 skips only to step S10 in which the arithmetic device 1 outputs the depiction of the trajectory defined by the sequence of movement commands to the user 8.

Owing to the presence of steps S61 to S68, during the course of the execution of step S10, the positions p', p" in which the difference $\delta$n in the normal vectors n' and n" is above the sixth maximum change $\delta$n2 are therefore additionally also highlighted by means of a marker 9.

As before, for example, the corresponding positions p', p" can be bordered in accordance with the depiction in FIG. 5. Other types of depiction are also possible. For example, the corresponding positions p', p" can be displayed in a flashing manner or be displayed in another color. The type of marker can be the same as previously for the distances a but can alternatively be another marker.

In the simplest case the sixth maximum change $\delta$n2 is a strictly predefined value. Preferably, however, a step S69 is additionally present in accordance with the depiction in FIG. 8. In this case, in step S69 the arithmetic device determines the sixth maximum change $\delta$n2 as a function of the distance a between the positions p', p" of the two movement commands of the respective pair of movement commands. The above statements relating to the type of dependence of the first maximum change $\delta\alpha 1$ on the distance a of the positions p(m), p(m−1) of directly successive movement commands can also be applied in an analogous manner to the sixth maximum change $\delta$n2. The sixth maximum change $\delta$n2—viewed as a function of the distance a—can have the same profile as one of the other maximum changes $\delta\alpha 1$, $\delta\alpha 2$, $\delta\beta 1$, $\delta\beta 2$, $\delta$n1. However, this is not absolutely necessary.

The embodiments of FIGS. 7 and 10 can be implemented as required alternatively or in addition to the embodiments of FIGS. 10 and 12 and/or alternatively or In addition to the embodiments of FIGS. 13 and 14. The embodiments of FIGS. 10 and 12 can likewise be implemented as required alternatively or in addition to the embodiments of FIGS. 13 and 14.

To summarize, the present invention therefore relates to the following facts:

Movement commands of a sequence of movement commands each define a position p to be adopted by a tool 6 of a processing machine relative to a workpiece 7. During execution of the sequence of movement commands by means of a control device 5 of the processing machine, the tool 6 machines the workpiece 7 at least temporarily. The movement commands are converted during their execution by the control device 5 of the processing machine into a trajectory containing the defined positions p. A depiction of the trajectory defined by the sequence of movement commands is output to a user 8. The distances a between the positions p of directly successive movement commands are determined. Positions p of directly successive movement commands, whose distance a is below a predetermined minimum distance a1, are highlighted in the depiction by means of a marker 9.

The present invention has many advantages. In particular, those locations of the parts program 4 which are to be assessed as critical (in the sense of the surface quality achieved) can easily and readily be seen by the user 8. The inventive evaluation method can furthermore not only be carried out with the parts program 4 and the movement commands therein as such, but also with the movement commands which are determined on the basis of the parts program 4. Examples of such sequences of movement commands are the intermediate outputs after the compressor of the numerical control and even the sequences of desired values which are output to the position-controlled axes A1 to An.

Although the invention has been illustrated and described in detail by the preferred exemplary embodiment, it is not restricted by the disclosed examples and a person skilled in the art can derive other variations herefrom without departing from the scope of protection of the invention.

What is claimed is:

1. A method for evaluating a sequence of movement commands which each define a position to be adopted by a tool of a processing machine relative to a workpiece, the method comprising:
   defining with the movement commands additionally an orientation to be adopted by the tool relative to the workpiece,
   executing the sequence of movement commands with a control device of the processing machine so as to at least intermittently machining the workplece with the tool,
   during execution of the movement commands, converting the movement commands into a trajectory which includes the defined positions and the defined orientation,
   determining distances between the defined positions and a change in the defined orientation of directly consecutive movement commands,
   highlighting with a marker the defined positions of the directly consecutive movement commands having a distance less than a predetermined minimum distance and a change in the defined orientation greater than a first maximum change distance, and
   outputting to a user a depiction of the trajectory with the marker.

2. The method of claim 1, further comprising determining the first maximum change distance as a function of the defined distance between the positions of the respective directly consecutive movement commands.

3. The method of claim 1, further comprising
   determining for the positions to be adopted by the tool pairs of movement commands having respective positions below a predetermined first minimum distance,
   determining for the pairs of movement commands a difference in the orientations to be adopted by the tool relative to the workpiece, and
   highlighting with a marker the positions of the pairs of movement commands wherein the difference of orientations is above a second maximum change.

4. The method of claim 3, wherein the second maximum change is determined as a function of the relative distance between the mutual positions of respective pairs of the movement commands.

5. The method of claim 1, further comprising:
   defining with the movement commands additionally a respective direction of movement to be adopted by the tool relative to the workpiece,
   during execution of the movement commands, converting the movement commands into a trajectory which includes the defined orientation and the respective direction of movement at the defined positions, and moving the tool in the corresponding direction of movement,
   determining for the positions to be adopted by the tool additionally a cross-product of the direction of movement and the orientation,
   determining a change in direction of the cross-product of directly consecutive movement commands, and
   highlighting with a marker the positions of directly consecutive movement commands wherein the change in the direction of the cross-product is above a third maximum change.

6. The method of claim 5, wherein the third maximum change is determined as a function of the distance between the positions of the respective directly consecutive movement commands.

7. The method of claim 5, further comprising:
   determining for the positions to be adopted by the tool pairs of movement commands having respective positions below a predetermined second minimum distance,
   determining for the pairs of movement commands a difference in directions of the cross-products of the direction of movement and the orientation, and
   highlighting with a marker the positions of pairs of movement commands wherein the difference in the directions of the cross-products is above a fourth maximum change.

8. The method of claim 7, wherein the fourth maximum change is determined as a function of the distance between the positions of the respective pair of directly consecutive movement commands.

9. The method of claim 1, further comprising:
   defining with the movement commands additionally a respective direction of movement to be adopted by the tool relative to the workpiece,
   during execution of the movement commands, converting the movement commands into a trajectory which includes the defined orientation and the respective direction of movement at the defined positions, and moving the tool in the corresponding direction of movement, determining for the positions to be adopted by the tool from the direction of movement and the orientation a normal vector oriented orthogonally to the surface of the workpiece at the defined positions, determining a change in a direction of the normal vector of directly consecutive movement commands, and highlighting with a marker the positions of directly consecutive movement commands wherein the change in the direction of the normal vector is above a fifth maximum change.

10. The method of claim 9, wherein the fifth maximum change is determined as a function of the distance between the positions of a respective pair of directly consecutive movement commands.

11. The method of claim 9, further comprising:

determining for the positions to be adopted by the tool pairs of movement commands, wherein the respective positions are below a predetermined third minimum distance, determining for the pairs of movement commands a difference in the directions of the normal vectors, and highlighting with a marker the positions of respective pairs of movement commands wherein the difference in the directions of the normal vectors is above a sixth maximum change.

12. The method of claim 11, wherein the sixth maximum change is determined as a function of the distance between the positions of a respective pair of directly consecutive movement commands.

13. A computer program comprising machine code stored on a machine-readable non-transitory medium, wherein the machine code, when loaded into a memory of an arithmetic device and executed by the arithmetic device, causes the arithmetic device to evaluate a sequence of movement commands which each define a position and an orientation to be adopted by a tool of a processing machine relative to a workpiece, execute the sequence of movement commands with a control device of the processing machine, and at least intermittently machine the workpiece with the tool, during execution of the movement commands, convert the movement commands into a trajectory which includes the defined positions and the defined orientation, determine distances between the defined positions of directly consecutive movement commands and a change in the defined orientation, highlight the defined positions of the directly consecutive movement commands having a distance less than a predetermined minimum distance and a change in the defined orientation greater than a first maximum change distance with a marker, and output to a user a depiction of the trajectory with the marker.

14. An arithmetic device programmed with a computer program comprising machine code stored on a machine-readable non-transitory medium, wherein the machine code when loaded into a memory of the arithmetic device and executed by the arithmetic device, causes the arithmetic device during operation to evaluate a sequence of movement commands which each define a position and an orientation to be adopted by a tool of a processing machine relative to a workpiece, execute the sequence of movement commands with a control device of the processing machine, and at least intermittently machine the workpiece with the tool, during execution of the movement commands, convert the movement commands into a trajectory which includes the defined positions and the defined orientation, determine distances between the defined positions of directly consecutive movement commands and a change in the defined orientation, highlight the defined positions of the directly successive movement commands having a distance less than a predetermined minimum distance and a change in the defined orientation greater than a first maximum change distance with a marker, and output to a user a depiction of the trajectory with the marker.

* * * * *